UNITED STATES PATENT OFFICE.

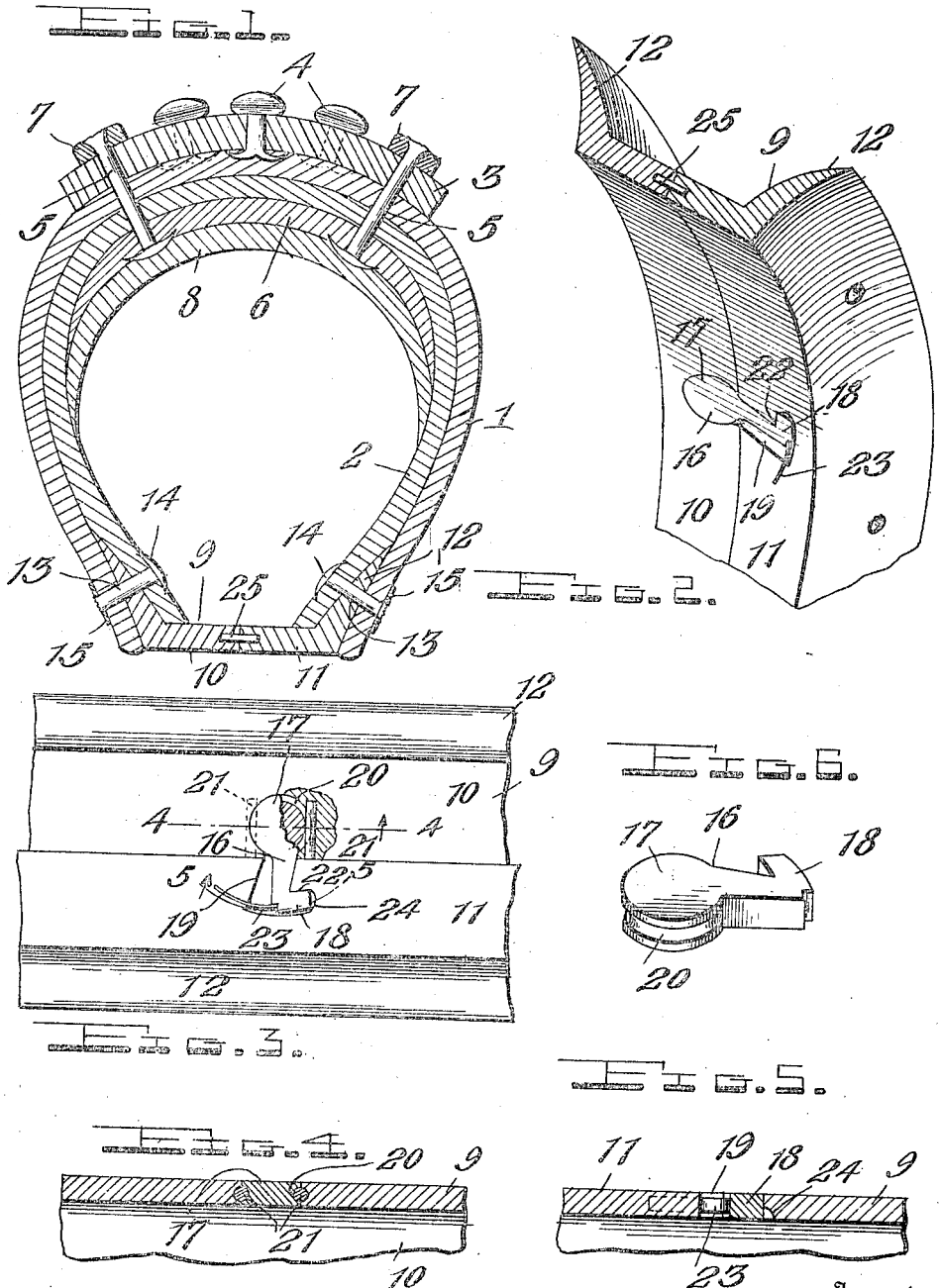

JOHN W. MOORE, OF HUNTSVILLE, ALABAMA.

TIRE-CASING.

971,301. Specification of Letters Patent. Patented Sept. 27, 1910.

Application filed January 31, 1910. Serial No. 541,148.

*To all whom it may concern:*

Be it known that I, JOHN W. MOORE, a citizen of the United States, residing at Huntsville, in the county of Madison and State of Alabama, have invented certain new and useful Improvements in Tire-Casings, of which the following is a specification, reference being had to the accompanying drawings.

My invention relates to improvements in tire casings of the quick detachable double tube pneumatic type.

The principal object of the invention is to dispense with the necessity of demountable rims with their many parts and providing a ready inflated tire complete in itself, which may be easily applied to the various forms of quick detachable rims now commonly used on the wheels of automobiles and other vehicles.

Further objects of the invention are to provide a tire casing of this character which will be exceedingly simple and strong in construction and capable of being quickly and easily opened and closed without the use of wrenches and various other tools; which will entirely inclose the inner tube of the tire and effectively protect the same; which will enable the inner tube to be inflated when the device is on or off of the wheel, thereby providing a ready inflated tire which may be applied to the usual wheel rims without altering the construction of the same and in an exceedingly short period and with little effort.

With the above and other objects in view, the invention consists of the novel construction, combination and arrangement of parts, hereinafter fully described and claimed, and illustrated in the accompanying drawings in which:—

Figure 1 is a cross sectional view through my improved tire casing; Fig. 2 is a sectional perspective view of the two part channeled base which closes the casing and reinforces and strengthens it; Fig. 3 is a detail view of the inner face of the sectional or channeled base of the casing, parts being broken away and in section; Figs. 4 and 5 are detail sectional views taken respectively on the lines 4—4 and 5—5 in Fig. 3; Fig. 6 is a perspective view of one of the locking members or catches which unite the parts or sections of the channeled base or ring of the tire casing.

Referring more particularly to the drawings 1 denotes the body of my improved tire casing which constitutes the outer tube of a double tube pneumatic tire and is adapted to entirely close and effectively protect the ordinary inflated inner tube (not illustrated). The body 1 is preferably constructed of two or more superposed layers 2 of leather, rubber or other material and its tread surface is preferably protected by a heavy tread layer 3 of leather or the like which contains the usual headed and clenched armor rivets 4 to prevent skidding and to protect the layer 3 from wear. This layer 3 is detachably secured so that it can be replaced when worn, the same being effected by providing at intervals around it and adjacent its side edges fastening rivets 5 which have cup-shaped heads at their inner ends to engage an inner protecting layer 6, and their outer ends are upset and countersunk in heavy washers or disks 7. The second protecting layer 8 is preferably arranged within the body of the casing to protect the inner tube of the tire from the rivets 5. While this is the preferred manner of constructing and armoring the body of the casing I wish it understood that the latter may be otherwise constructed.

The body 1 of the casing is closed by a base 9 here shown in the form of a channeled ring composed of two separable parts or sections 10, 11, which are angular in cross section and have their inwardly extending flanges abutting and detachably united by improved fastening means, and their outwardly extending flanges tapered or beveled as shown at 12 and secured between the layers 1 and 2 by rivets 13. The latter have cup-shaped or dished heads 14 at their inner ends, and their outer ends are upset and countersunk in washer 15, as shown in Fig. 1, thereby providing an effective connection between the flexible body 1 of the casing and the rigid metal base ring 9. The inner flanges of the two annular ring sections 10, 11, are detachably united by improved fastening means consisting of an annular series of transverse locking members 16 which are in the form of catches pivoted to one ring section and adapted to detachably engage the other. These locking members or catches 16 are arranged at suitable intervals around the base ring and each of them has an enlarged circular end 17 which forms a pivot and is rotatable in a circular recess or opening formed in the inner flange of the ring section 10, the remaining portion of the member or catch 16 being angular to form a hook-shaped arm 18 which swings in an angular recess or opening 19 formed in the inner flange of the other ring section 11. To retain the pivot portion 17 in position its edge is formed with an annular groove 20 adapted to receive transverse pins 21 inserted in sockets or openings formed in the inner flange of the ring section 10 and intersecting tangentially a circular opening therein. The hook-shaped end or arm 18 of the locking member or catch engages a shoulder 22 formed by the angular shape of the recess or opening 19, and thereby prevents the lateral separation of the ring sections 10, 11, and in order to retain said catch in its operative position a locking spring 23 is provided. This locking spring is in the form of a leaf spring having one of its ends secured by forcing it in a kerf in the ring section 11 and its free end bears against the arm 19 to prevent the latter from swinging out of engagement with the shoulder 22. When the free end of the spring is sprung out of engagement with the arm 18 the latter may be swung to its unlocked position, and to permit said arm 18 to be readily engaged a notch 24 is provided at one end of the recess or opening 19 to permit the insertion of a tool to engage and actuate the catch. If desired opposing sockets may be formed around the abutting edges of the inner flanges of the sections 10, 11, for the reception of dowel pins 25, as shown in Figs. 1 and 2.

From the foregoing it will be seen that my invention provides a tire casing of similar construction which will be exceedingly strong and durable and which will effectively inclose and protect the inner tube whether inflated or deflated. The construction of the casing with the flexible body portion and the rigid channeled base ring gives the device great strength and enables it to contain an inflated inner tube, and at the same time maintain its shape so that the device can be applied to the rim of an ordinary wheel in an exceedingly short time and with little trouble. Furthermore, this construction enables it to be used in connection with detachable rims now commonly found on the wheels of automobiles and the like, without altering the construction of such wheels; and it effectively dispenses with the use of demountable rims which have numerous parts and fastenings.

Having thus described the invention what is claimed is:

1. A tire casing comprising a flexible body to inclose an inner tube, a base ring to close the tire casing, and composed of two annular metallic sections of angular shape in cross section, said sections having inturned abutting flanges, and upwardly projecting flanges united to the edges of the body of the casing, and means detachably uniting the inturned abutting flanges of the two annular sections.

2. A tire casing comprising a flexible body to inclose an inner tube, and having at its edges two layers of material, a channeled base member to close the tire casing and composed of two annular metallic sections of angular shape in cross section, said sections having inturned abutting flanges, and outwardly projecting flanges tapering outwardly and arranged between the layers of material at the side edges of the body of the casing, rivets passed through said layer of material and said outwardly projecting flanges to unite the two metallic base sections to the edges of the body of the casing, and detachable fastening devices uniting the inturned abutting flanges of the two annular sections of the base ring.

3. A tire casing comprising a body to inclose an inner tube, an annular base ring to close the tire casing and consisting of separable sections united to the edges of said body, one of said sections being formed in its inner edge with a circular pivot opening, and the other section having in its opposing inner edge an angular shouldered opening, a catch having a grooved circular pivot portion rotatable in said pivot opening, and an angular hook-shaped arm to swing in said angular shouldered opening, pins in one of said sections to engage the groove in the pivot portion of the catch and retain the latter in position, and a spring in said angular shouldered opening to engage the hook-shaped end of the catch and retain the latter in locking position.

In testimony whereof I hereunto affix my signature in the presence of two witnesses.

JOHN W. MOORE.

Witnesses:
R. P. WEEDEN,
J. T. JONES.